United States Patent [19]

Wang

[11] Patent Number: 4,977,343

[45] Date of Patent: Dec. 11, 1990

[54] ELECTRIC MOTOR COMMUTATOR SECURED TO ROTOR BY CONFINED EPOXY

[75] Inventor: Patrick S. Wang, Repulse Bay, Hong Kong

[73] Assignee: Johnson Electric S.A., La Chaux de Fonds, Switzerland

[21] Appl. No.: 420,255

[22] Filed: Oct. 12, 1989

[30] Foreign Application Priority Data

Oct. 13, 1988 [GB] United Kingdom ................. 8823993

[51] Int. Cl.⁵ ................................ H02K 15/00

[52] U.S. Cl. ................................ 310/42; 310/233

[58] Field of Search ...................... 310/42, 43, 45, 156, 310/233, 235, 236

[56] References Cited

U.S. PATENT DOCUMENTS

| | | | |
|---|---|---|---|
| 1,274,411 | 8/1918 | Halbleib et al. | 310/236 |
| 2,822,483 | 2/1958 | de Jean et al. | 310/45 |
| 3,737,988 | 6/1973 | Bednarski | 310/45 |
| 4,357,522 | 11/1982 | MacMillan | 310/42 |
| 4,422,911 | 1/1984 | Manson | 310/156 |
| 4,433,261 | 2/1984 | Nashiki et al. | 310/156 |

*Primary Examiner*—Steven L. Stephan

*Assistant Examiner*—D. L. Rebsch

*Attorney, Agent, or Firm*—Fleit, Jacobson, Cohn, Price, Holman & Stern

[57] ABSTRACT

A rotor in an electric motor comprises a shaft having a commutator and armature thereon. To prevent relative movement between the armature lamination stack and the commutator, a structural coating such as epoxy resin coats the shaft between the commutator and stack. The commutator base has a coaxial recess in the adjacent end. The base is urged towards the stack while the coating is still fluid to gather up the coating so that it is of substantial thickness on the shaft, at least partially filling the recess and a radial slot in the recess wall.

2 Claims, 2 Drawing Sheets

ELECTRIC MOTOR COMMUTATOR SECURED TO ROTOR BY CONFINED EPOXY

INTRODUCTION

The present invention relates to a process for producing a rotor in an electric motor, particularly in a fractional horsepower PMDC motor and an electric motor incorporating such a rotor.

BACKGROUND TO THE INVENTION

Many small PMDC motors are used in automobiles and are subject to harsh conditions. A fuel pump motor may be mounted on the engine block and subject to very severe G forces, sometimes up to 100 G. Forces of this magnitude can cause relative movement of the laminated armature stack and the commutator on the motor shaft, which may strain or break the armature winding wire.

The armature stack is typically provided with a structural coating such as epoxy resin. The coating may be allowed to flow along the shaft to the commutator base. However, the coating thus formed on the shaft tends to crack as the shaft flexes and thus may crumble or flake and allow the commutator to creep relative to the stack.

SUMMARY OF THE INVENTION

A first aspect of the invention provides a process for the production of a rotor in an electric motor, the process comprising mounting an armature lamination stack and a commutator base on a shaft of the motor, the commutator base having a recess in an end thereof facing the lamination stack, coating the stack with a coating material which will set to form a structural coating, the coating material also coating the shaft in the region between the commutator base and the shaft, and urging the commutator base and stack together on the shaft to obtain a predetermined spacing therebetween before the coating material sets, the arrangement being such that coating material on the shaft is gathered up by the recess, and allowing the coating to set.

Preferably, apertures or slots are provided in a sidewall of the recess. These may allow air to escape as the material passes into the recess and also provide a key for the coating material.

A second aspect of the invention provides an electric motor having a rotor comprising a shaft of the motor and an armature lamination stack and commutator mounted on the shaft, wherein a base of the commutator has a recess in an end thereof, facing the stack, and a structural coating is provided on the stack, the coating extending along the motor shaft and into the recess in the commutator base.

Preferably the structural coating is an epoxy paint or the like which is commonly used to insulate lamination stacks and form the laminations into a coherent body.

DESCRIPTION OF THE PREFERRED EMBODIMENT

Figure 1:
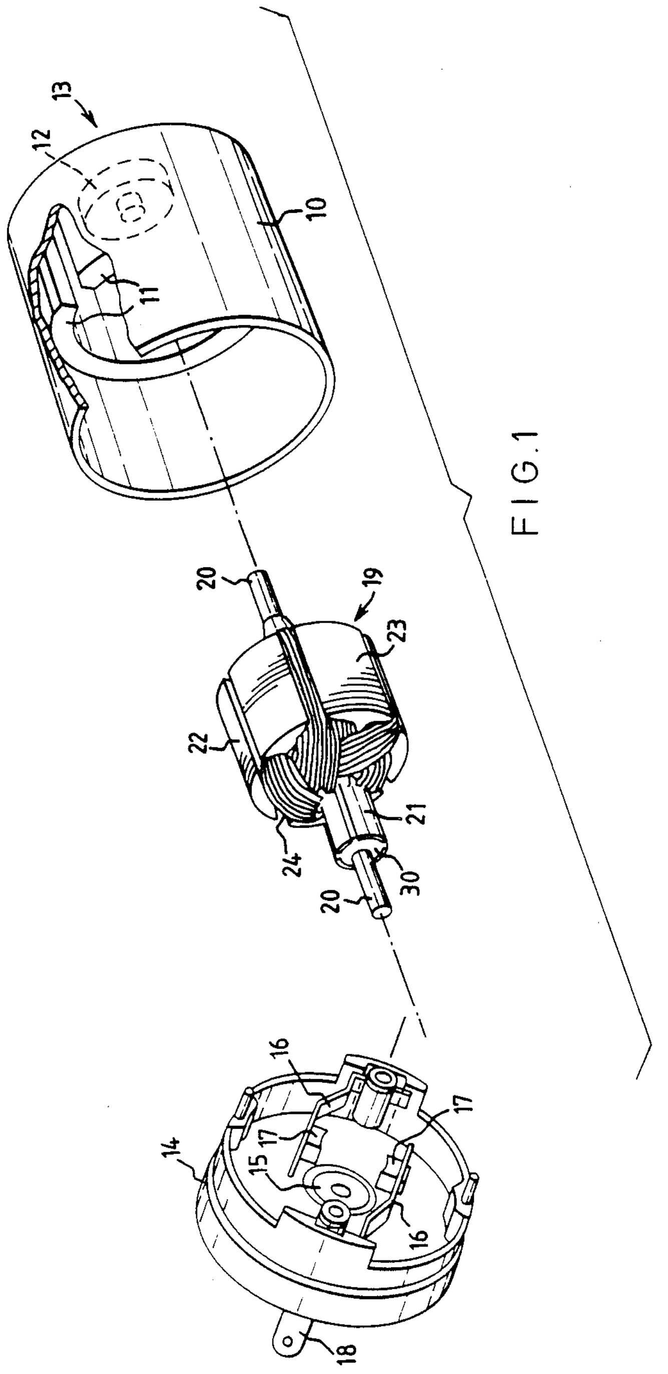
FIG. 1 is an exploded perspective view of a fractional horsepower PMDC motor embodying the invention.

FIG. 1 shows a fractional horsepower PMDC motor having a housing comprising a deep drawn can-like steel casing 10 carrying permanent magnets 11, and a bearing 12 in an end wall 13. The casing 10 is closed by a plastic end cap 14 which carries a bearing 15, two brushleaves 16 each carrying a brush 17 and two terminals 18 (one is shown) in electrical contact with the brushleaves 16. A rotor 19 of the motor comprises a shaft 20 and a commutator 21 and wound armature 22 mounted on the shaft 20. The armature 22 comprises a stack 23 of steel laminations which are a tight fit on the shaft 20 and a wire winding 24 wound about the arms of the armature and connected to the commutator 21.

In the assembled motor the shaft 20 runs in the bearings 12, 15, the end cap 14 closing the casing 10 and the brushes 17 bearing on the commutator 21.

The construction thus far described is well known in the art.

In use, the motor shown may be subject to high G forces along the shaft 20. Although the lamination stack 23 and commutator 21 are a tight fit on the shaft 20 there is a tendency for them to creep along the shaft 20. It is known to coat lamination stacks with a coating of epoxy resin paint. This serves to form an insulating coating over which the armature wire 24 is wound, and to hold the laminations together. In accordance with the present invention this coating is arranged to serve an additional purpose.

Figure 3:
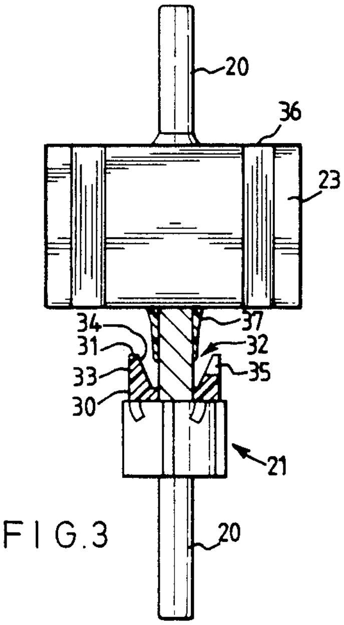
FIG. 3 is a side view partly cut away of the rotor of FIG. 2 during the assembly process.

Referring to FIG. 3, the commutator 21 comprises a molded plastic base 30. An end face 31 of the base, facing the stack 23, has a recess 32 which encircles the shaft 20. The recess 32 has an outer wall 33 whose inner surface 34 tapers coaxially frusto-conical, tapering outwardly towards the lamination stack, and a plurality of slots 35 are formed in the wall 33.

Figure 2:
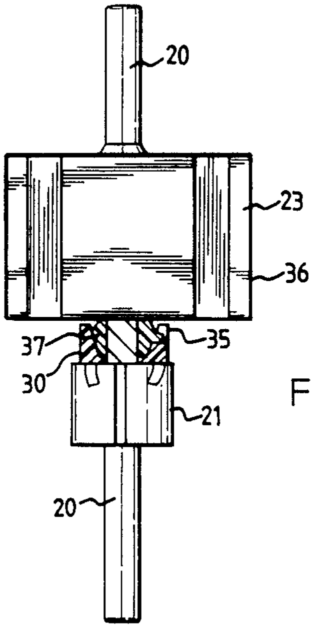
FIG. 2 is a side view partly cut away of a rotor of the motor of FIG. 1 with the armature winding removed.

To assemble the rotor, the lamination stack 23 and the commutator 21 are mounted on the shaft 20. The commutator and stack are separated by a distance, greater than the distance of separation required in the finished rotor. The stack 23 is sprayed with an epoxy resin coatin 36 which is allowed to flow down the shaft towards the end face 31 of the commutator base 30 (FIG. 3). A portion 37 of the coating flowing over the shaft between the stack 23 and commutator 21. Whilst the coating 36 is still fluid, the commutator and stack are urged together to the required distance of separation (FIG. 2). The portion 37 of the coating on the shaft is thus "gathered up" in the recess 32 to that a coating of relatively substantial thickness is formed about the shaft 20 between the commutator base 30 and the stack 23 (FIG. 2).

Slots 35 in the recess wall 33 allow air to escape from the recess. In FIG. 2 it can be seen that the commuator base approaches close to the lamination stack.

The wall of the recess 32 will serve to hold the epoxy coating in place if it cracks. Also the slots 35 may provide a key for the epoxy, helping to prevent relative rotation of the commutator and armature.

After the coating has set, the armature is wound in the usual way.

The commutator may be complete before mounting on the shaft or the segments may be added to the base after mounting it on the shaft.

Various modifications may be made to the described embodiment and it is desired to include all such modifications and functional equivalents as fall within the scope of the accompanying claims.

What is claimed is:

1. An electric motor having a rotor comprising a shaft of the motor and an armature lamination stack and commutator mounted on the shaft, wherein a base of the commutator has a recess in an end facing the stack, said recess being defined by a wall of the base which wall has at least one radial slot therein, and a structural coating is provided on the stack, the coating extending along the motor shaft substantially filling the recess and the slot.

2. An electric motor as claimed in claim 1, wherein an inner surface of the wall tapers radially inwardly away from the lamination stack.

* * * * *